United States Patent
McCormick et al.

(10) Patent No.: US 9,510,616 B2
(45) Date of Patent: Dec. 6, 2016

(54) METHOD OF DEFROSTING A FOOD ITEM

(71) Applicant: NEW ENGLAND SEAFOOD INTERNATIONAL LTD, Chessington, Surrey (GB)

(72) Inventors: Neil McCormick, Chessington (GB); Terry Walden, Chessington (GB); Cesar Basalo, Chessington (GB)

(73) Assignee: NEW ENGLAND SEAFOOD, Surrey (GB)

( * ) Notice: Subject to any disclaimer, the term of this patent is extended or adjusted under 35 U.S.C. 154(b) by 470 days.

(21) Appl. No.: 13/722,894

(22) Filed: Dec. 20, 2012

(65) Prior Publication Data

US 2014/0178539 A1   Jun. 26, 2014

(51) Int. Cl.
*A23L 3/365* (2006.01)
*A23B 4/07* (2006.01)

(52) U.S. Cl.
CPC . *A23L 3/365* (2013.01); *A23B 4/07* (2013.01)

(58) Field of Classification Search
CPC .................................. A23B 4/07; A23L 3/365
USPC ............................................ 426/231; 99/483
See application file for complete search history.

(56) References Cited

U.S. PATENT DOCUMENTS

| | | |
|---|---|---|
| 3,220,333 A | 11/1965 | Davison |
| 4,812,622 A * | 3/1989 | Takeda et al. ................. 219/400 |
| 5,086,693 A * | 2/1992 | Tippmann et al. ............. 99/333 |
| 5,401,520 A | 3/1995 | Skaar et al. |
| 5,441,098 A | 8/1995 | Kristensen |
| 2004/0066835 A1* | 4/2004 | Drews ............................ 374/135 |

FOREIGN PATENT DOCUMENTS

| | | |
|---|---|---|
| DE | 100 51 951 C1 | 7/2002 |
| EP | 0 298 063 A1 | 1/1989 |
| EP | 1 145 651 A1 | 10/2001 |
| FR | 2378480 | 8/1978 |
| FR | 2460462 A1 | 1/1981 |
| GB | 1163578 A2 | 9/1969 |
| GB | 2091402 A | 7/1982 |
| JP | 2006046843 A | 2/2006 |
| WO | WO 91/03178 A1 | 8/1991 |
| WO | WO 97/28704 A1 | 8/1997 |
| WO | WO 02/41713 A1 | 5/2002 |

OTHER PUBLICATIONS

European Search Report dated Jun. 3, 2013, issued in European Application No. 12198730.
http://www.acfri.com/.
(Continued)

*Primary Examiner* — Jianying Atkisson
(74) *Attorney, Agent, or Firm* — EIP US LLP

(57) ABSTRACT

A method of defrosting a food item, including: monitoring a temperature of a first part of a first food item; and controlling a surrounding temperature of the first food item in dependence on said monitored temperature. The controlling includes: decreasing the surrounding temperature of the first food item, using an unheated fluid having a temperature less than the surrounding temperature of the first food item, when the surrounding temperature is greater than a target surrounding temperature for a given temperature of the first part. Embodiments also relate to a control system, apparatus and a computer program product.

20 Claims, 4 Drawing Sheets

(56) References Cited

OTHER PUBLICATIONS http://www.afosgroup.com/food/readcasestudies.asp?a=10.
http://www.biojus.com/acfri/asite/docptf/plaquette_GB_rabat_2009-2010.pdf.
http://www.carnitech.com/media/85830/ct%202031%20climatically%20controlled%20air%20thawing.pdf.
http://www.dawsongroup.co.uk/temperaturecontrolsolutions/pdfs/tempordefrost.pdf.
http://www.defrost.dk/.
http://www.defrost.dk/1.htm.
http://www.defrost.dk/1_1.htm.
http://www.defrost.dk/1_2.htm.
http://www.defrost.dk/1_3.htm.
http://www.defrost.dk/1_4.htm.
Seafood thawing, Research & Development, SR598, Feb. 2008, 41 pages, http://www.seafish.org/media/Publications/SR598_Thawing.pdf.

* cited by examiner

METHOD OF DEFROSTING A FOOD ITEM

TECHNICAL FIELD

The present invention relates to a method of defrosting a food item, for example a loin of tuna.

BACKGROUND

Systems for defrosting frozen food items are known. These involve blowing heated air over frozen food until it reaches a desired defrosted temperature. However, for food items which are not evenly shaped, for example those having one part notably thinner than another part, the known methods can lead to overheating of the thinner part and an incomplete defrost of the thicker part. Spoiling of the food item can thus occur. This may lead to bacterial growth, may render the food item unsuitable for human consumption, and may spoil the quality of the food item which could reduce its sale price and affect its taste.

Such problems are particularly noticeable when defrosting fish. In particular, tuna is sensitive to spoiling when being defrosted. For example, a frozen loin of tuna requires care to defrost as often one end of a loin is significantly thicker than the other end; thus it is difficult to defrost the loin evenly, without spoiling. Moreover, tuna flesh is more sensitive to spoiling than other fish. Firstly, there is a risk of histamines forming in the flesh if overheating of the flesh occurs. Secondly, the high concentration of haemoglobin in tuna flesh means the flesh can quickly deteriorate if overheated, which degrades the quality of the texture and colour of the tuna flesh.

It is desirable to provide an improved method of defrosting a food item, which is suitable for defrosting of tuna.

SUMMARY

In accordance with first embodiments, there is provided a method of defrosting a food item, including:
monitoring a temperature of a first part of a first food item; and
controlling a surrounding temperature of the first food item in dependence on said monitored temperature, the controlling including:
i) decreasing the surrounding temperature of the first food item, using an unheated fluid having a temperature less than the surrounding temperature of the first food item, when the surrounding temperature is greater than a target surrounding temperature for a given temperature of the first part.

According to further embodiments, there is provided a control system for controlling defrosting a frozen food item using apparatus comprising:
a chamber for providing at least one food item therein for defrosting;
a temperature control system for changing a temperature within the chamber; and
a temperature monitoring system for monitoring a temperature of at least one part of a food item,
wherein the control system is configured to control the temperature control system to control a surrounding temperature for at least one food item in dependence on a temperature of at least one part of a food item monitored by the temperature monitoring system, the control system being configured to control the temperature control system to:
i) decrease the surrounding temperature of at least one food item in the chamber, using an unheated fluid having a temperature less than the surrounding temperature of the food item, when the surrounding temperature is greater than a target surrounding temperature for a given temperature of the first part.

In accordance with other embodiments, there is provided apparatus for defrosting a frozen food item, comprising:
a chamber for providing at least one food item therein for defrosting;
a temperature control system for changing a temperature within the chamber;
a temperature monitoring system for monitoring a temperature of at least one part of a food item; and
a control system configured to control the temperature control system to control a surrounding temperature for at least one food item in dependence on a temperature of at least one part of a food item monitored by the temperature monitoring system, the control system being configured to control the temperature control system to:
i) decrease the surrounding temperature of at least one food item in the chamber, using an unheated fluid having a temperature less than the surrounding temperature of the food item, when the surrounding temperature is greater than a target surrounding temperature for a given temperature of the first part.

In further embodiments there is provided a computer program product comprising a non-transitory computer-readable storage medium having computer readable instructions stored thereon, the computer readable instructions being executable by a computerised device to cause the computerised device to perform a method of defrosting a food item using apparatus comprising:
a chamber for providing at least one food item therein for defrosting;
a temperature control system for changing a temperature within the chamber; and
a temperature monitoring system for monitoring a temperature of at least one part of a food item,
the method including controlling the temperature control system to control a surrounding temperature for at least one food item in dependence on a temperature of at least one part of a food item monitored by the temperature monitoring system, the method including controlling the temperature control system to:
i) decrease the surrounding temperature of at least one food item in the chamber, using an unheated fluid having a temperature less than the surrounding temperature of the food item, when a surrounding temperature of the food item is greater than a target surrounding temperature for a given temperature of the first part.

Further features will become apparent from the following description of embodiments, given by way of example only, which is made with reference to the accompanying drawings.

DETAILED DESCRIPTION

Figure 1:
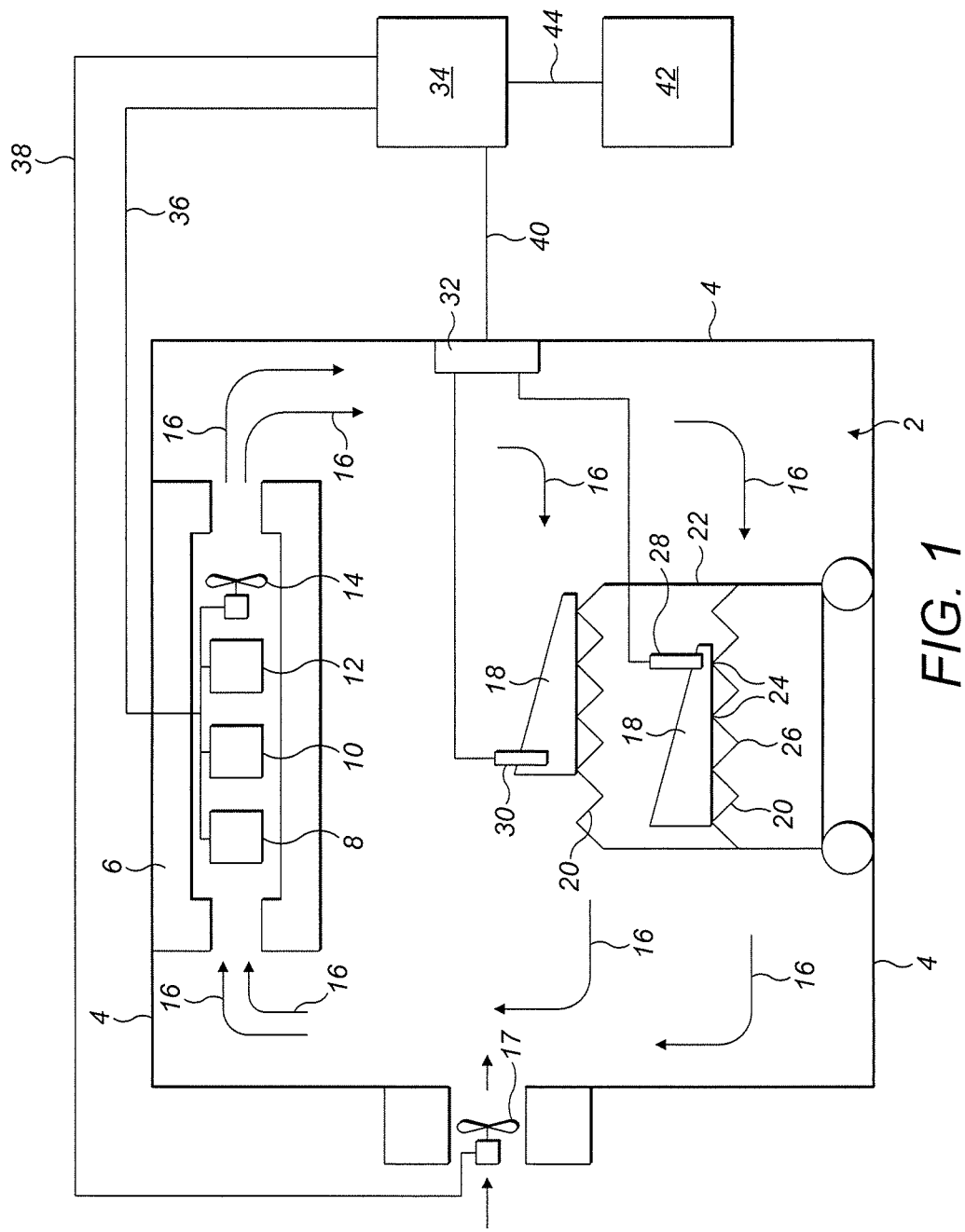
FIG. 1 shows schematically apparatus for defrosting a food item according to embodiments.

In accordance with embodiments, there is provided a method of defrosting a food item, including:

monitoring a temperature of a first part of a first food item; and controlling a surrounding temperature of the first food item in dependence on the monitored temperature, the controlling including:

i) decreasing the surrounding temperature of the first food item, using an unheated fluid having a temperature less than the surrounding temperature of the first food item, when the surrounding temperature is greater than a target surrounding temperature for a given temperature of the first part.

This method allows a food item, for example a frozen tuna loin, to be defrosted carefully and to a high quality, with reduced or minimum spoiling compared with known systems. By decreasing the surrounding temperature when the monitored temperature is greater than the target surrounding temperature at a given temperature, i.e. a particular temperature of a first part of the food item, using the unheated fluid, the surrounding temperature can be decreased rapidly to the target surrounding temperature. This reduces exposure of the food item to a temperature greater than desired.

An unheated fluid described herein has not been heated using a heater such as a heater used in apparatus for defrosting a food item. By using the unheated fluid with a temperature less than the surrounding temperature, the surrounding temperature is decreased in an active manner; the unheated fluid is provided to act to cool the surrounding temperature by for example mixing with, and removing heat energy from, warmer fluid surrounding the food item and/or for example by replacing warmer fluid surrounding the food item with the cooler unheated fluid. This active cooling may be contrasted with decreasing the surrounding temperature in a passive manner, where decreasing the surrounding temperature is not assisted by providing a cooler fluid.

In some embodiments, the controlling further includes:

ii) increasing a surrounding temperature of the first food item when the surrounding temperature is less than a target surrounding temperature for a given temperature of the first part.

Thus, by increasing the surrounding temperature when the monitored temperature is less than the target surrounding temperature at a given temperature, i.e. a particular temperature of the first part, in combination with the decreasing described above, a core of the food item may be defrosted effectively whilst maintaining a temperature of a surface of the food item at a temperature to reduce or avoid spoiling.

In further embodiments, the unheated fluid may have a temperature less than or equal to the target surrounding temperature. Therefore, particularly when the temperature of the unheated fluid is less than the target surrounding temperature, the surrounding temperature may be decreased rapidly to the target surrounding temperature, thus reducing exposure of the food item to a greater than desired temperature.

The unheated fluid may comprise solely a gas or a liquid, or may be a mixture of a gas and a liquid, for example a vapour of a liquid such as water suspended in a gas. In some embodiments, the unheated fluid comprises a refrigerated fluid, for example a refrigerated gas. Therefore, the controlling may include controlling a refrigerator to provide the refrigerated fluid for the decreasing of the surrounding temperature. By using a refrigerated fluid during defrosting, the surrounding temperature may be accurately controlled to prevent overheating of a food item during defrosting, for example if exposed to a heated fluid provided during defrosting. Moreover, by using a refrigerated fluid during defrosting, a lower surrounding temperature may be achieved during defrosting than known systems using solely heated gas for defrosting. Thus, as the food item is defrosted, the surrounding temperature may be lowered to a temperature close to or the same as a target temperature of the first part of the food item at the end of defrosting. This gives a better quality defrost process than known systems which use solely heated gas for defrosting.

In other embodiments, the unheated fluid may comprise unheated fluid, for example a gas, drawn from outside of a chamber in which the first food item is being defrosted. The controlling may therefore include controlling a fluid intake to provide the unheated fluid into the chamber for the decreasing of the surrounding temperature. Thus, the surrounding temperature of the food item may be controlled rapidly by mixing and/or replacing a fluid surrounding the food item with fluid external to the defrosting chamber. For example, if the unheated fluid external to the chamber is refrigerated, or has an ambient temperature less than the surrounding temperature of the food item, the external fluid may be used to quickly reduce the temperature within the chamber.

In further embodiments, the controlling includes controlling a heater for the increasing of the surrounding temperature. Thus, during defrosting, further control of the surrounding temperature is enabled, to avoid for example previously provided refrigerated gas from overcooling a food item during defrosting, which could undesirably lead to refreezing of a surface of the food item. Thus, controlling the heater in combination with controlling the refrigerator and/or the fluid intake described above, provides an accurate and food safe method of defrosting a food item.

In further embodiments, the controlling includes performing the decreasing and increasing alternately, to alternate the surrounding temperature below and above a target surrounding temperature for a given temperature of the first part. Such alternation of the surrounding temperature during defrosting allows the surrounding temperature to accurately follow a series of target surrounding temperatures during defrosting. The resulting defrosted food item is therefore of a good quality, with reduced or no spoiling.

In some embodiments, the surrounding temperature is alternated within a range having a minimum temperature of 10% of the target surrounding temperature for a given temperature of the first part, below the target surrounding temperature, and a maximum temperature of 10% of the target surrounding temperature for a given temperature of the first part, above the target surrounding temperature. For example, if the target surrounding temperature is 20 degrees Celsius, the minimum temperature would be 18 degrees Celsius and the maximum temperature would be 22 degrees Celsius. By limiting the alternation of the surrounding temperature above and below a target surrounding temperature, in this example by 10% above and below, i.e. an alternation within a total of 20%, a surface of the food item may not be exposed to an extreme surrounding temperature for the given temperature of the first part, which could cause spoiling of the food item. This range of temperature alternation has been found to be suitable for reducing or avoiding spoiling of tuna flesh during the method of defrosting.

In further embodiments, the target surrounding temperature for a given temperature of the first part decreases as the first food item defrosts. Consequently, the surrounding temperature is controlled to decrease during defrosting, such that a difference between the surrounding temperature and the first part of the food item decreases. This reduces the possibility of spoiling of the first part during defrosting, compared with known systems which use heated gas with a larger temperature difference between the surrounding temperature and the food item during defrosting.

According to embodiments, the method includes:

monitoring a temperature of a second part of the first food item or of a second food item, said controlling including controlling the surrounding temperature of the first food item in dependence on the monitored temperature of the second part. By monitoring a temperature of the first and second parts, the defrosting of a food item may be controlled accurately to reduce or avoid spoiling of the food item. The term second food item is used to refer to a further food item, different from the first food item.

In some examples, the controlling includes controlling the surrounding temperature in dependence on a difference between a temperature of the first part and a temperature of the second part. This difference may change depending on the progress in defrosting the food item. By taking this into account when controlling the surrounding temperature, the food item may be more controllably defrosted, to reduce or avoid spoiling.

In other examples, the controlling may include controlling the surrounding temperature such that a difference between the surrounding temperature and the temperature of the first part decreases as the difference between the temperature of the first part and the temperature of the second part decreases. Thus, as the temperature of the first part, for example a surface part, and of the second part, for example a core part, get closer to each other, a temperature of the second part may influence the temperature of the first part to a lesser degree. Therefore, the surrounding temperature may be controlled to be closer in temperature to a temperature of the first part, to avoid an increase in the size of temperature fluctuations in the first part as the food item is defrosted.

In embodiments, the controlling includes controlling the surrounding temperature to maintain a temperature of the first part below a predetermined absolute maximum temperature for the first food item. The absolute maximum temperature may be a temperature above which the food item spoils. For example, where the food item is tuna, the absolute maximum temperature may be 4 degrees Celsius.

In examples, the first part is a surface part of the first food item and the second part is a core part of the first food item or of the second food item.

In further examples, the first food item and the second food item comprises tuna flesh and may be a piece of tuna, such as a loin of tuna. The tuna may be bluefin tuna, yellowfin tuna, or another species of tuna. In other examples, the food items may be a cut of beef, a leg of lamb, a salmon fillet, or other meat or fish items.

In further embodiments, there is provided a control system for controlling defrosting of a frozen food item using apparatus comprising:

a chamber for providing at least one food item therein for defrosting;

a temperature control system for changing a temperature within the chamber; and a temperature monitoring system for monitoring a temperature of at least one part of a food item, wherein the control system is configured to control the temperature control system to control a surrounding temperature for at least one food item in dependence on a temperature of at least one part of a food item monitored by the temperature monitoring system, the control system being configured to control the temperature control system to:

i) decrease the surrounding temperature of at least one food item in the chamber, using an unheated fluid having a temperature less than the surrounding temperature of the food item, when the surrounding temperature is greater than a target surrounding temperature for a given temperature of the first part.

In further embodiments, the control system may further be configured to:

ii) increase the temperature of the chamber when the surrounding temperature is less than a target surrounding temperature for a given temperature of the first part.

In other embodiments, there is provided apparatus for defrosting a frozen food item, comprising:

a chamber for providing at least one food item therein for defrosting;

a temperature control system for changing a temperature within the chamber;

a temperature monitoring system for monitoring a temperature of at least one part of a food item; and a control system configured to control the temperature control system to control a surrounding temperature for at least one food item in dependence on a temperature of at least one part of a food item monitored by the temperature monitoring system, the control system being configured to control the temperature control system to:

i) decrease the surrounding temperature of at least one food item in the chamber, using an unheated fluid having a temperature less than the surrounding temperature of the food item, when the surrounding temperature is greater than a target surrounding temperature for a given temperature of the first part.

In some embodiments, the temperature control system may comprise a fluid intake arranged to provide at least part of said unheated fluid from outside of the chamber. The control system may be configured to control the fluid intake for said decreasing of the temperature of the chamber. Thus, the surrounding temperature of a food item in the chamber may be controlled more effectively.

In further embodiments, the temperature control system may comprise a refrigerator arranged to provide refrigerated fluid in the chamber, wherein the control system may be configured to control the refrigerator for said decreasing of the temperature of the chamber. Thus, the surrounding temperature may further be controlled effectively.

In further embodiments, there is provided computer software for controlling defrosting of a food item using apparatus comprising:

a chamber for providing at least one food item therein for defrosting;

a temperature control system for changing a temperature within the chamber; and a temperature monitoring system for monitoring a temperature of at least one part of a food item, the computer software being adapted to control the temperature control system to control a surrounding temperature for at least one food item in dependence on a temperature of at least one part of a food item monitored by the temperature monitoring system, the computer software being adapted to control the temperature control system to:

i) decrease the surrounding temperature of at least one food item in the chamber, using an unheated fluid having a temperature less than the surrounding temperature of the food item, when a surrounding temperature of the food item is greater than a target surrounding temperature for a given temperature of the first part.

Thus, apparatus may be provided and controlled for providing the method of embodiments and examples described herein.

Detailed examples of embodiments will now be described.

FIG. 1 shows schematically an example of apparatus for defrosting a food item, which in this example is a frozen loin of tuna.

In this example, the apparatus comprises a chamber 2 which in this example is defined by chamber walls 4, made for example of stainless steel, which form a closed chamber. The chamber is formed for providing at least one food item therein for defrosting. Attached to an upper part of the chamber is a temperature control system 6 for changing a temperature within the chamber. The temperature control system comprises in this example a heater 8 and a refrigerator 10 for changing the temperature of a gas, for example air, in the chamber and therefore a surrounding temperature of at least one food item in the chamber. In some examples there is a gas humidity control unit 12 which may increase or decrease the humidity of gas in the chamber. As illustrated in this example this is part of the temperature control system, but in other examples may be provided elsewhere in the chamber. A blower, for example a fan 14 is provided for circulating gas around the chamber, for passing over a surface of at least one food item in the chamber. In this example, a clockwise direction 16 of gas circulation is illustrated, but in other examples an anti-clockwise direction is envisaged. It is envisaged that the circulation path of gas in the chamber may be determined by appropriate positioning of ducts and blowers, so that heating and/or cooling of a surface of each of a plurality of food items is applied evenly, for uniform defrosting. One fan may be used to circulate gas in either direction, by reversing the direction of rotation of the fan, or in other examples a separate fan may be used for each different direction of circulation. In some examples, the direction of circulation may be changed periodically, for example every 15 minutes, to the opposite direction of circulation, to promote even defrosting of food items. In this example, there is a fluid intake, for example a further blower such as a fan 17, as a further part of the temperature control system, for drawing unheated gas from outside the chamber into the chamber. The space outside of the chamber may be a refrigerated space of a room housing the chamber and in which food items may be unpacked for defrosting and packaged after defrosting. Thus, the further fan 17 may blow refrigerated gas, such as air, from the room into the chamber, to assist the temperature control system in controlling the temperature of the chamber.

In this example, there are two frozen tuna loins 18 for defrosting. Each tuna loin is placed on a rack 20, which may be part of a trolley 22 for easy transport of the tuna loins into and out of the chamber via a sealable door. The rack comprises a plurality of protrusions, in this example ridges 24, for supporting a food item. The ridges facilitate draining of water away from the food item during defrosting, into channels 26 between the ridges. Thus, the amount of water the food item is in contact with during defrosting may be minimised; where the food item is tuna, this reduces the chance of any discolouration, for example whitening, of the tuna flesh from being in contact with water during defrosting. For simplicity, only one trolley is illustrated, but it is to be understood that a plurality of trolleys may be provided together in the chamber.

The apparatus comprises a temperature monitoring system for monitoring a temperature of at least one part of a food item. The temperature monitoring system comprises at least one probe for measuring a temperature of a part of a food item. In this example two probes are used per trolley; a first probe 28 is inserted into or applied to a first part of a first tuna loin, in this example the smallest tuna loin on the trolley, and a second probe 30 is inserted into or applied to a second part of a second tuna loin, in this example the largest tuna loin on the trolley. In other examples, the second probe may be inserted into or applied to a second part of the first tuna loin. In this example, the first part is a surface part of the tuna loin and the second part is a core part of the tuna loin. The first part may be at the surface of the thinnest part of the smallest tuna loin, i.e. the part which will defrost most quickly, whereas the second part may be at the centre of the thickest part of the thickest tuna loin, i.e. the part which will take the longest to defrost. An example of a suitable probe is a thermocouple (TC) platinum resistance thermometer assembly. In this example each probe is connected to a probe control terminal 32 for controlling each probe and interpreting signals from the probe to indicate a probe temperature. The temperature monitoring system in this example also comprises a sensor (not shown) for measuring a temperature inside the chamber and therefore the surrounding temperature of at least one food item in the chamber. The surrounding temperature is therefore the temperature of the gas being circulated in the chamber, around the food items. The sensor may be positioned in the chamber to measure the temperature representative of the gas in contact with the plurality of food items.

Figure 2:
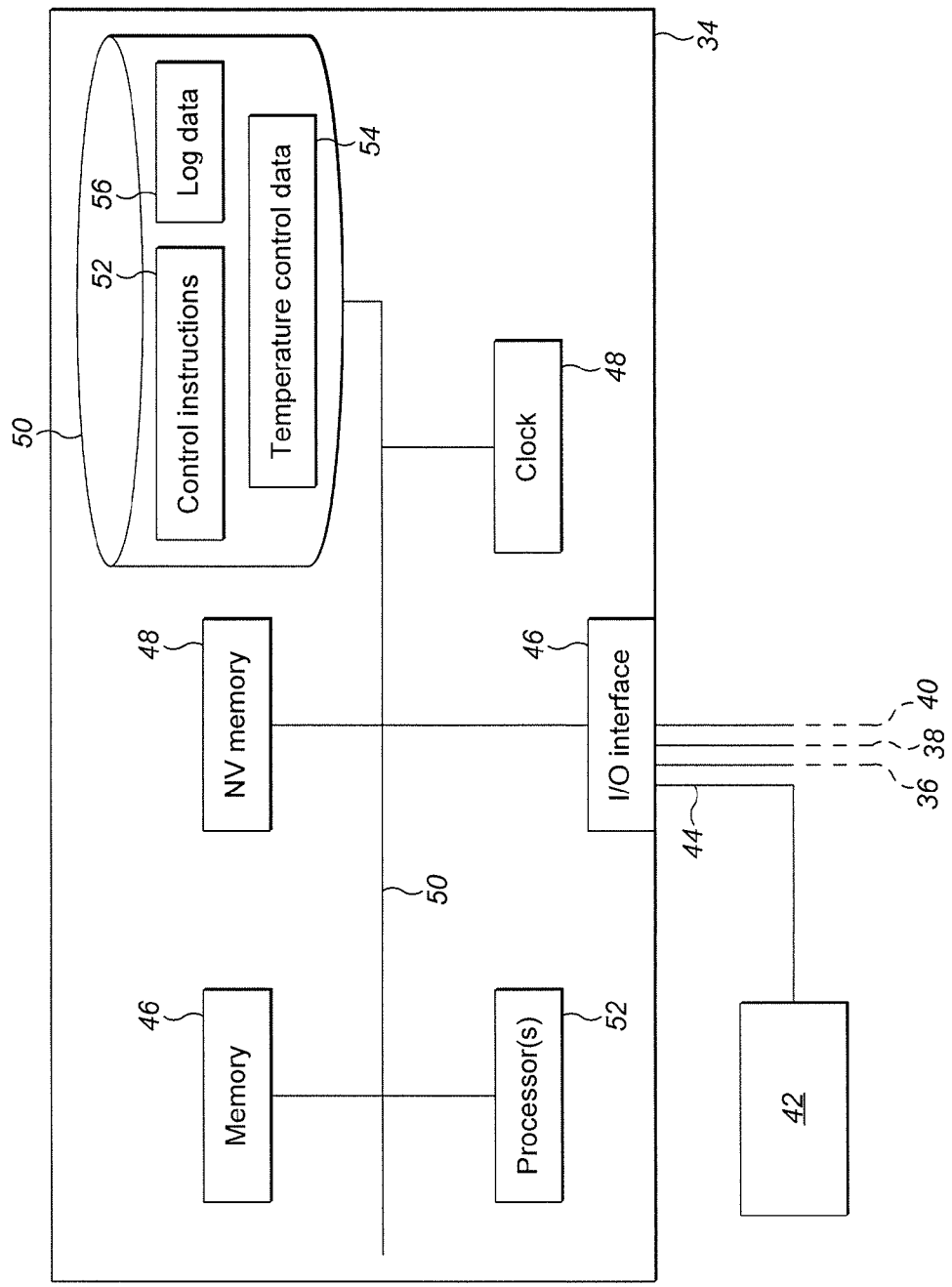
FIG. 2 shows schematically a control system according to embodiments.

There is a control system 34 for controlling the apparatus for defrosting a frozen food item. The control system is connected 36 to the temperature control system 6, so as to control the heater 8, the refrigerator 10, the humidity control unit 12, and the fan 14. The control system is further connected 38 to control the further fan 17, and further connected 40 to the probe control terminal 32 for receiving data indicative of a temperature of at least one part of the food item, in this case the first and second parts of the first and second tuna loins. A touch screen 42 is connected 44 to an input/output (I/O) interface of the control system 34 for displaying settings and a status for controlling of the apparatus. Further, the touch screen allows a user to provide inputs such as control data for controlling the apparatus. FIG. 2 shows schematically an example of the control system 34. The I/O interface 46 is illustrated, connected to the touch screen 42, and with connections 36, 38, 40 which continue to connect to the temperature control system 6, the further fan 17 and the probe control terminal 32 described previously.

FIG. 2 shows an example of a hardware architecture for the control system 34. The controlling system 34 may be a computing device comprising: volatile memory 46 such as Random Access Memory (RAM); non-volatile (NV) memory 48 such as a solid state drive (SSD) or Read Only Memory (ROM); one or more storage devices 50 such as magnetic tape or disc drives; one or more processors 52; the input/output (I/O) interface 46; and a system clock 48. The components of the computing device may be interconnected using a systems bus 50. Computer software, for example control instructions 52, for operating the computing device and adapted to control the apparatus for defrosting a food item, in accordance with any methods described herein, may be stored in any of the volatile memory 46, the NV memory 48 and the one or more storage devices 50; in this example the control instructions are computer readable instructions, stored on a storage device 50 which may include a non-transitory computer-readable storage medium, which are executable by a computerised device such as the controlling system 34. The storage device 50 further in this example stores temperature control data 54 including data indicative of a plurality of target surrounding temperature values each corresponding with a given temperature of the first part of a food item. Log data 56 indicative of for example a temperature of the first part, a temperature of the second part and a surrounding temperature of at least one food item, over a time period for defrosting the at least one food item, is also stored on the storage device 50. Other data indicative of a parameter relating to the method of defrosting described herein may also may stored in the log data 56. The log data may be recorded during a defrosting method, for analysis after a defrosting process.

The computing device may further comprise a communications interface (not shown) such as an Ethernet port for communicating with for example another computing device over a communications network such as the Internet, or a local area network (LAN); this may facilitate for example remote checking of progress of a defrosting method, remote control of the defrosting method, checking a status of the defrosting apparatus and/or updating settings of the defrosting apparatus, for example the temperature control data 54. An alarm may also be connected to the I/O interface for emitting an alarm sound when a food item has been defrosted. The control system may for example be a Siemens S7-300 PLC Control Module, or a personal computer. An example of a suitable touch screen is a Siemens MP277 Control Screen.

A method of defrosting a food item, in this example a loin of tuna, will now be described in accordance with an embodiment, referring to the example of the apparatus given above.

Figure 3:
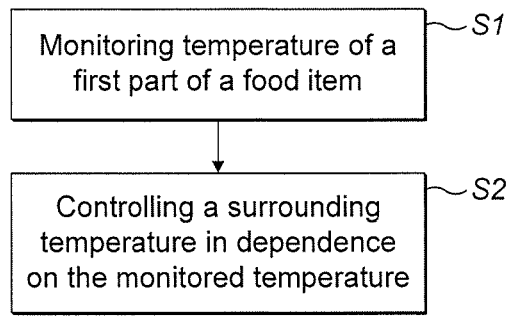
FIG. 3 is a flow diagram showing steps of a method of embodiments.

FIG. 3 is a flow diagram showing steps of the method of defrosting of this embodiment. In a first step S1 the method includes monitoring a temperature of a first part of a first food item, in this case the surface part of a loin of tuna. In a second step S2 the method includes controlling a surrounding temperature of the first food item in dependence on the monitored temperature, the controlling including decreasing the surrounding temperature of the food item, using an unheated fluid having a temperature less than the surrounding temperature of the first food item, when the surrounding temperature is greater than a target surrounding temperature for a given temperature of the first part. In these examples the controlling further includes increasing a surrounding temperature of the first food item when the surrounding temperature is less than a target surrounding temperature for a given temperature of the first part.

Further details of the method of this embodiment will be described with reference to FIGS. 4 and 5, in relation to the apparatus described above using FIG. 1.

Before a frozen food item such as the loin of tuna in this case is defrosted, the control system may be programmed with temperature control data 54 via the touch screen 42 for example. The temperature control data in this example includes data indicative of a plurality of target surrounding temperature values each corresponding with a given temperature of the first part. The temperature control data is used to control the surrounding temperature in dependence on the monitored temperature of the first part of the food item. Since the first part in this example is the thinnest part of the food item, it is most susceptible to spoiling; therefore, the temperature control data is set to control the surrounding temperature so the first part does not spoil. The temperature control data is input by a user and specifies for a plurality of consecutive temperatures for the first part a corresponding target surrounding temperature; i.e. the temperature control data specifies the target surrounding temperature when the first part has a given temperature. For defrosting tuna, the temperature control data has for example the parameters set out in Table 1, with the surface temperature being the temperature of the first part. Therefore, for example, where the first part has a temperature in the range of −7 to −9 degrees Celsius, a target surrounding temperature may be set at 20 degrees Celsius; and where the first part has a temperature in the range of −5 to −7 degrees Celsius, the target surrounding temperature is set at 17.5 degrees Celsius.

TABLE 1

| Surface Temperature/ degrees Celsius (C.) | Target Surrounding Temperature/degrees C. |
|---|---|
| >+1 | 2.5 |
| +1 to 0 | 6 |
| 0 to −1 | 8 |
| −1 to −2 | 10 |
| −2 to −3 | 12 |
| −3 to −4 | 14 |
| −4 to −5 | 16 |
| −5 to −7 | 17.5 |
| −7 to −9 | 20 |
| −9 to −11 | 22 |
| −11 to −13 | 24 |
| −13 to −15 | 26 |
| −15 to −25 | 29 |
| −25 to −40 | 32 |
| −40 to −60 | 34.5 |
| <−60 | 36 |

In other examples, rather than a range of first part temperatures for each target surrounding temperature value of the first part, a different target surrounding temperature is set for each integer temperature of the first part, as illustrated later in FIG. 4.

The temeprature control data may be set to achieve a rapid defrost while avoiding the risk of refreezing of a part of the food item and/or overheating.

The temperature control data in this example further includes data indicative of a target defrost temperature for each of a first part of a food item and of a second part of a food item, which defines when the food item or, as in the example given above and below, the trolley of food items, is considered to be defrosted. The user can set the temperature control data via the touch screen, for example such that a tuna loin is considered defrosted when a temperature of a core part reaches −1.8 degrees Celsius and when a temperature of a surface part reaches −1 degrees Celsius.

The temperature control data 54 further includes in this example data indicative of a predetermined absolute maximum temperature for the food item, below which the surrounding temperature must be maintained to avoid spoiling. Thus, during the defrosting, the control system controls the surrounding temperature to maintain a temperature of the first part below the absolute maximum temperature. In the case of tuna, the absolute maximum temperature may be set at 4 degrees Celsius.

The temperature control data may be specific to a particular food item, since different types of food, for example of meat or fish, exhibit different defrosting characteristics and have different tolerances to temperature before spoiling.

In preparation for defrosting at least one loin of tuna in this example, temperature control data 50 is selected using the control system which is appropriate for defrosting tuna. At least one loin of tuna 18 is placed on the rack 20 of the trolley 22 and inserted in the chamber 2. In this example, as explained above, two tuna loins are for defrosting. A first probe 28 is inserted into or applied to the first part of the first tuna loin and a second probe 30 is inserted into the second part of the second tuna loin. Thus, the temperature of the first part and the temperature of the second part may be monitored by the temperature monitoring system during defrosting. As explained above, in this example, the surface of the thinnest part of the smallest tuna loin per trolley is used as the controlling tuna loin for the defrosting; when the core part of the largest tuna loin per trolley is defrosted, this indicates completion of defrosting the tuna loins on the trolley in question, which can then be removed from the chamber. Then, in an example with a plurality of trolleys, defrosting is continued for the remaining trolleys in the chamber. In this way, as the smallest tuna loin per trolley is most susceptible to spoiling during defrosting, the surrounding temperature is controlled in dependence on the temperature of the first part of the smallest tuna loin, to reduce or avoid spoiling for all tuna loins per trolley. It is to be appreciated that instead of monitoring the temperature of the first and second parts of the smallest and largest tuna loins, respectively, per trolley, in alternative embodiments, the first and second parts of the smallest and largest tuna loins, respectively, in the chamber may be monitored, for example.

Figure 4:
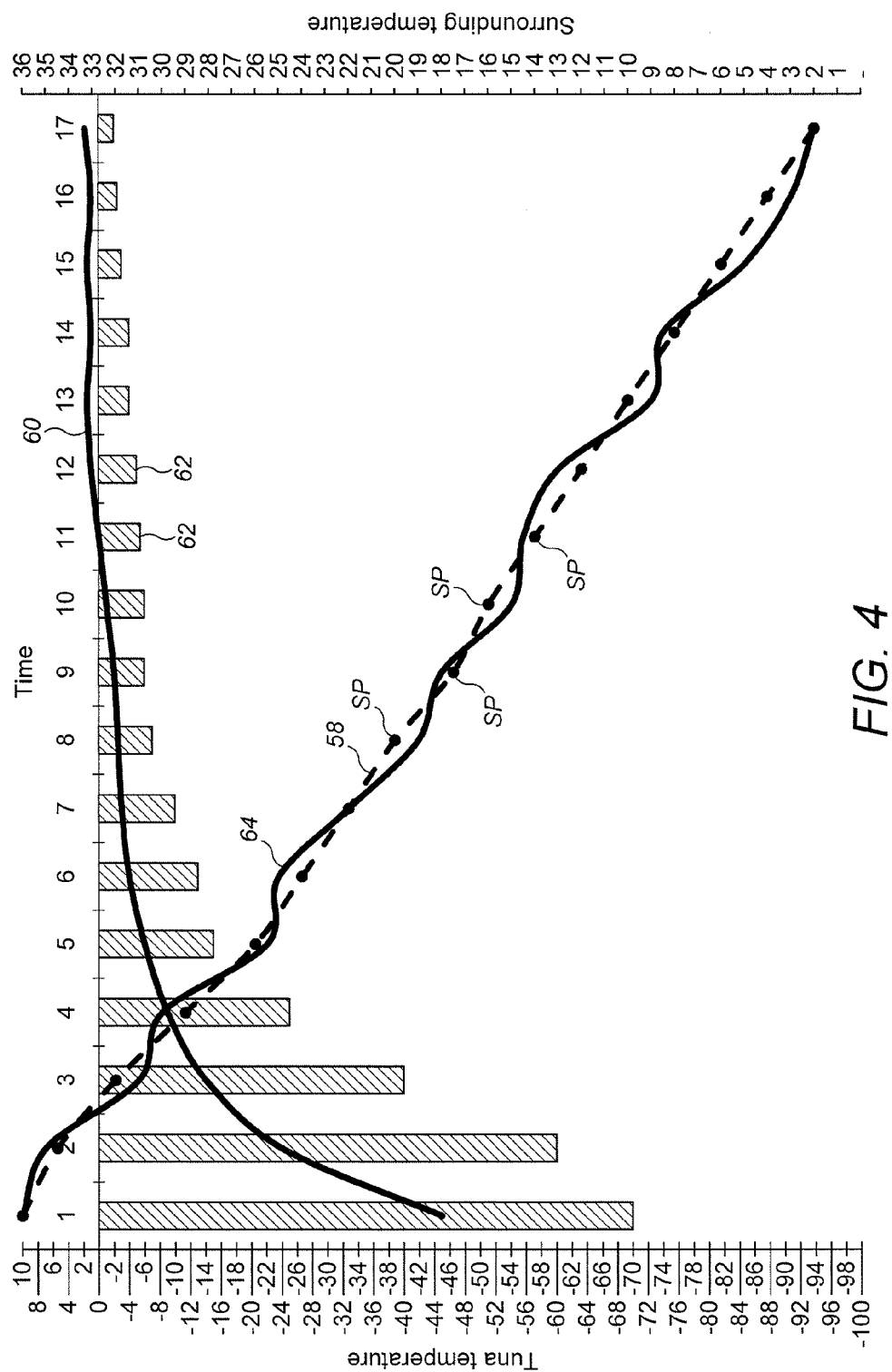

FIG. 4 illustrates a first plot line 58 representative of a plurality of set points SP each representing a target surrounding temperature for the tuna loins in the chamber for a given temperature of the first part. The right hand vertical axis gives the surrounding temperature scale in degrees Celsius and the horizontal axis represents time with an arbitrary scale.

Plotted also in FIG. 4 is a second plot line 60 showing an example of the change in temperature of the first part during defrosting, plotted against the left hand vertical axis giving the tuna temperature scale in degrees Celsius. By comparing the second plot line with the first plot line, it can be seen how the temperature of the first part changes in dependence on the surrounding temperature; thus, the target surrounding temperature for a given temperature of the first part decreases as the food item defrosts.

Further in FIG. 4, bars 62 illustrate the change in temperature of the second part, plotted against the left hand tuna temperature scale.

When defrosting starts, the temperature of the first part is measured by the first probe. The control system receives data representative of the temperature of the first part from the probe control terminal. The processor accesses the temperature control data and identifies the target surrounding temperature corresponding with the measured temperature of the first part. The processor compares this identified target surrounding temperature with the present surrounding temperature, i.e. the temperature of gas in the chamber, which in this example is measured by the sensor described previously. If the surrounding temperature of the food item is greater than the target surrounding temperature for the given temperature of the first part measured with the first probe, the processor signals to the temperature control system, particularly the refrigerator to refrigerate the gas in the chamber, to decrease the surrounding temperature so the target surrounding temperature may be met. If instead the surrounding temperature of the food item is less than the target surrounding temperature for the given temperature of the first part measured with the first probe, the processor signals to the temperature control system, particularly the heater to heat the gas in the chamber, to increase the surrounding temperature so the target surrounding temperature may be met.

The intensity of heating or refrigerating the gas may be controlled depending on the difference between the current surrounding temperature and the target surrounding temperature, and/or depending on the temperature of the first and/or second parts of the food item(s). For example, a lower intensity of heating or refrigerating of the gas in the chamber may be used later in the defrosting process, when a food item is more uniformly defrosted, compared with earlier in the defrosting process, since a higher intensity of heating or refrigerating later in defrosting would more quickly change the temperature of the first part of the food item, which could risk overheating or overcooling of the food item. In one example, the intensity of heating may be higher before the first part reaches its freezing/melting point. Thus, defrosting may occur at a quicker rate before reaching the freezing/melting point than after that point. In the case of tuna the freezing/melting point may be −1.9 degrees Celsius, although it is to be understood that this value may vary between different pieces of tuna, depending for example on factors such as the salt concentration of the tuna flesh.

The flow rate of gas circulating in the chamber may also be controlled to control the surrounding temperature, by controlling the speed of the fan 14. The processor may also control the further fan 17 to assist control of the surrounding temperature. Further, the humidity control unit may be controlled to adjust the humidity of gas in the chamber, to assist control of the surrounding temperature. The humidity may further be controlled to reduce the humidity of gas in the chamber, to remove water released from the food item during defrosting from a surface of the food item. Removing such surface water may reduce or avoid spoiling of the food item. For example, in the case of tuna, water on its surface can cause discolouration of the tuna flesh.

When the target surrounding temperature is met, the control system controls the temperature control system to maintain the present surrounding temperature, or, in the case of overshooting the target surrounding temperature, the surrounding temperature is increased or decreased to reverse the overshoot of the target surrounding temperature. In this way the surrounding temperature may be controlled in dependence on the monitored temperature of the first part of the food item.

In practice, as the surrounding temperature is controlled, the food item defrosts, meaning the temperature of the first part may not be stationary. Therefore, the temperature of the first and second parts may continuously rise, and this is monitored by the temperature monitoring system. Therefore, during defrosting the control system receives data indicative of the rising temperature of the first part and compares this with the temperature control data, to identify the target surrounding temperature corresponding with the temperature of the first part at that time. The control system then controls the temperature control system to adjust the surrounding temperature if necessary, by increasing, decreasing or maintaining the surrounding temperature appropriately.

Referring to FIG. 4, a plot line 64 shows an example of the surrounding temperature of the food items during defrosting. Comparing this with the plot line 58 of the target surrounding temperature set points, it can be seen that the controlling of the temperature includes alternating the surrounding temperature above and below a target surrounding temperature for at least one given temperature of the first part. In this example, the alternating comprises alternating the surrounding temperature within a range having a maximum temperature of 10% of the target surrounding temperature for a given temperature of the first part, above the target surrounding temperature, and a minimum temperature of 10% of the target surrounding temperature for a given temperature, below the target surrounding temperature. Thus, a variation of the temperature of the first part can be limited to within +/−0.5 degrees Celsius.

In this example, the temperature of the second part is monitored using the second probe. The control system receives data indicative of the temperature of the second part and controls the surrounding temperature of the food item(s) in dependence on the monitored temperature of the second part. For example, the surrounding temperature may be controlled in dependence on a difference between a temperature of the first part and a temperature of the second part. For example, as the food item defrosts, the difference in temperature between the first and second parts decreases. Thus, each food item becomes more uniformly defrosted and the core part of each food item has less of a temperature influence over the temperature of the surface part of that food item. The surrounding temperature may therefore be controlled such that a difference between the surrounding temperature and the monitored temperature of the first part decreases as the difference between the temperature of the first part and the second part decreases. This can be seen by comparing plot lines 60 and 64 in FIG. 4; as defrosting progresses the surrounding temperature decreases towards 2 degrees Celsius in this example, and the temperature of the of the first part increases towards 2 degrees Celsius. Further, the intensity of refrigerating, the use of unheated gas via the further fan, and/or heating of gas in the chamber may be reduced, for example, as described previously.

In this example, when monitoring the temperature of the first and second parts, the control system is configured to identify when the target defrost temperature for the first and second parts is met, as indicated by the temperature control data. At this point, the control system may for example sound the alarm to alert a user that the tuna loins on the trolley in question are defrosted. This trolley may be removed from the chamber, and defrosting of the remaining tuna loins continued.

When a trolley of tuna loins is defrosted, and until that trolley is removed from the chamber, the control system may control the temperature control system to maintain the surrounding temperature at a holding temperature, for example a surrounding temperature of 2 degrees Celsius, which may be set in the temperature control data. This holding temperature is set to refrigerate the defrosted food items on the trolley and suspend or slow further defrosting of other not yet defrosted food items on other trolleys, to reduce or avoid spoiling.

Figure 5:
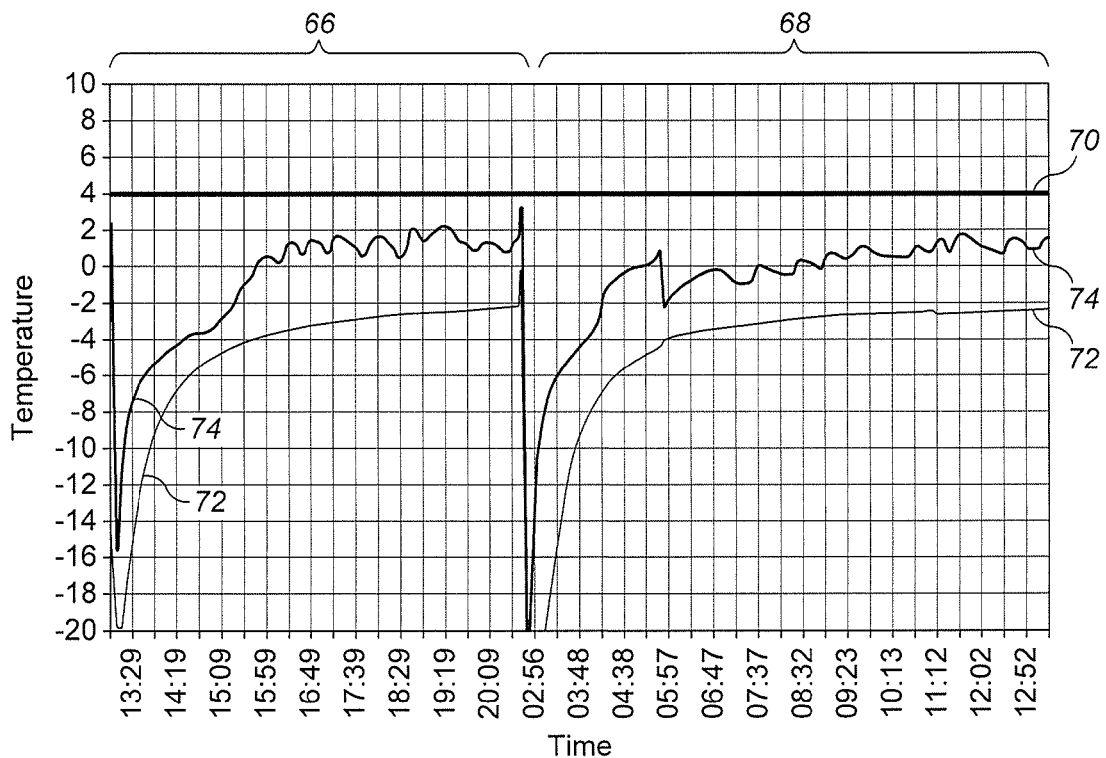
FIGS. 4 and 5 show examples of plots showing defrosting of tuna, according to embodiments.

FIG. 5 shows two example plots 66, 68 of defrosting a loin of tuna. Time is indicated on the x axis and tuna temperature on the y axis. Line 70 indicates the absolute maximum temperature of 4 degrees Celsius. Plot line 72 represents the core part temperature during defrosting and plot line 74 represents the surface part temperature during defrosting. As can be seen, the surface temperature in this example fluctuates as the surrounding temperature alternates above and below the target surrounding temperature for a given surface part temperature, as described above.

The above embodiments are to be understood as illustrative examples. Further embodiments are envisaged. For example, examples described above relate to a gas being used to defrost the food item(s); in further examples alternative fluids may be used, for example a liquid or a vapour. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the accompanying claims.

The invention claimed is:

1. A method of defrosting a food item, including:
providing a chamber for providing at least one food item therein for defrosting;
providing a temperature control system for changing a temperature within the chamber;
providing a temperature monitoring system for monitoring at temperature of a surface part of the at least one food item;
providing a control system configured to control the temperature control system to control a surrounding temperature for the at least on food item in dependence on the temperature of the surface part of the at least one food item, using temperature control data specifying, for a plurality of consecutive temperatures of the surface part of the at least one food item, corresponding target surrounding temperatures that decrease as the at least one food item defrosts, the control system being configured to control the temperature control system to decrease the surrounding temperature of the at least one food item in the chamber, using an unheated fluid having a temperature less than the surrounding temperature of the at least one food item, when the surrounding temperature is greater than a target surrounding temperature for a given temperature of the surface part;
monitoring, with the temperature monitoring system, a temperature of a surface part of a first food item; and
controlling, with the control system, a surrounding temperature of the first food item in dependence on said monitored temperature of the surface part of the first food item, using temperature control data specifying, for a plurality of consecutive temperatures of the surface part of the first food item, corresponding target surrounding temperatures that decrease as the first food item defrosts, the controlling including:
i) decreasing, with the temperature control system, the surrounding temperature of the first food item, using an unheated fluid having a temperature less than the surrounding temperature of the first food item, when the surrounding temperature is greater than a target surrounding temperature for a given temperature of the surface part.

2. A method according to claim 1, wherein the unheated fluid has a temperature less than or equal to the target surrounding temperature.

3. A method according to claim 1, wherein the unheated fluid comprises a refrigerated fluid.

4. A method according to claim 1, wherein the unheated fluid comprises unheated fluid drawn from outside of a chamber in which the first food item is being defrosted.

5. A method according to claim 1, the controlling further including:
ii) increasing a surrounding temperature of the first food item when the surrounding temperature is less than a target surrounding temperature for a given temperature of the surface part.

6. A method according to claim 5, said controlling including performing said decreasing and increasing alternately, to alternate the surrounding temperature below and above a target surrounding temperature for a given temperature of the surface part.

7. A method according to claim 6, said surrounding temperature being alternated within a range having a minimum temperature of 10% of the target surrounding temperature for a given temperature of the surface part, below the target surrounding temperature, and a maximum temperature of 10% of the target surrounding temperature for a given temperature of the surface part, above the target surrounding temperature.

8. A method according to claim 1, wherein the target surrounding temperature for a given temperature of the surface part decreases as the first food item defrosts.

9. A method according to claim 1, including:
monitoring a temperature of a second part of the first food item or of a second food item; and
controlling the surrounding temperature of the first food item in dependence on the monitored temperature of the second part.

10. A method according to claim 9, said controlling including controlling the surrounding temperature in dependence on a difference between a temperature of the surface part and a temperature of the second part.

11. A method according to claim 10, said controlling including controlling the surrounding temperature such that a difference between the surrounding temperature and the temperature of the surface part decreases as the difference between the temperature of the surface part and the temperature of the second part decreases.

12. A method according to claim 9, wherein the second part is a core part of the first food item or of the second food item.

13. A method according to claim 1, said controlling including controlling the surrounding temperature to maintain a temperature of the surface part below a predetermined absolute maximum temperature for the first food item.

14. A method according to claim 1, wherein the first food item, and, when the method includes monitoring a temperature of a second part of the first food item or of a second food item; and controlling the surrounding temperature of the first food item in dependence on the monitored temperature of the second part, the second food item, comprises tuna flesh.

15. A control system for defrosting a frozen food item using apparatus comprising:
a chamber for providing at least one food item therein for defrosting;
a temperature control system for changing a temperature within the chamber; and
a temperature monitoring system for monitoring a temperature of a surface part of the at least one food item,
wherein the control system is configured to control the temperature control system to control a surrounding temperature for the at least one food item in dependence on the temperature of the surface part of the at least one food item, using temperature control data specifying, for a plurality of consecutive temperatures of the surface part of the at least one food item, corresponding target surrounding temperatures that decrease as the at least one food item defrosts, the control system being configured to control the temperature control system to:
i) decrease the surrounding temperature of the at least one food item in the chamber, using an unheated fluid having a temperature less than the surrounding temperature of the at least one food item, when the surrounding temperature is greater than a target surrounding temperature for a given temperature of the surface part.

16. A control system according to claim 15, wherein the control system is further configured to:
ii) increase the temperature of the chamber when the surrounding temperature is less than the target surrounding temperature for a given temperature of the surface part.

17. Apparatus for defrosting a frozen food item, comprising:
a chamber for providing at least one food item therein for defrosting;
a temperature control system for changing a temperature within the chamber;
a temperature monitoring system for monitoring a temperature of a surface part of the at least one food item; and
a control system configured to control the temperature control system to control a surrounding temperature for the at least one food item in dependence on the temperature of the surface part of the at least one food item, using temperature control data specifying, for a plurality of consecutive temperatures of the surface part of the at least one food item, corresponding target surrounding temperatures that decrease as the at least one food item defrosts, the control system being configured to control the temperature control system to:
i) decrease the surrounding temperature of the at least one food item in the chamber, using an unheated fluid having a temperature less than the surrounding temperature of the at least one food item, when the surrounding temperature is greater than a target surrounding temperature for a given temperature of the surface part.

18. Apparatus according to claim 17, the temperature control system comprising a fluid intake arranged to provide at least part of said unheated fluid from outside of the chamber, wherein the control system is configured to control the fluid intake for said decreasing of the temperature of the chamber.

19. Apparatus according to claim 17, the temperature control system comprising a refrigerator arranged to provide refrigerated fluid in the chamber, wherein the control system is configured to control the refrigerator for said decreasing of the temperature of the chamber.

20. A computer program product comprising a non-transitory computer-readable storage medium having computer readable instructions stored thereon, the computer readable instructions being executable by a computerised device to cause the computerised device to perform a method of defrosting a food item using apparatus comprising a chamber for providing at least one food item therein for defrosting, a temperature control system for changing a temperature within the chamber, and a temperature monitoring system for monitoring a temperature of a surface part of the at least one food item, the method comprising:
monitoring, with the temperature monitoring system, a temperature of a surface part of the at least one food item;
controlling, with the control system, the temperature control system to control a surrounding temperature for the at least one food item in dependence on the temperature of the surface part of the at least one food item, using temperature control data specifying, for a plurality of consecutive temperatures of the surface part of the at least one food item, corresponding target surrounding temperatures that decrease as the at least one food item defrosts; and
controlling the temperature control system to:
i) decrease the surrounding temperature of the at least one food item in the chamber, using an unheated fluid having a temperature less than the surrounding temperature of the at least one food item, when the surrounding temperature of the at least one food item is greater than a target surrounding temperature for a given temperature of the surface part.

* * * * *